United States Patent [19]

Beer et al.

[11] Patent Number: 4,744,122

[45] Date of Patent: May 17, 1988

[54] SCRUBBING APPARATUS FOR VEHICLES

[75] Inventors: Carl C. Beer, Philadelphia, Pa.; Sherman L. Larson, Palmyra, N.J.

[73] Assignee: Sherman Industries, Inc., Palmyra, N.J.

[21] Appl. No.: 3,130

[22] Filed: Jan. 14, 1987

[51] Int. Cl.⁴ ............................................. B60S 3/04
[52] U.S. Cl. ................................ 15/97 B; 15/DIG. 2
[58] Field of Search ............... 15/97 B, DIG. 2, 53 R; 134/6

[56] References Cited

U.S. PATENT DOCUMENTS

| | | | |
|---|---|---|---|
| 3,487,490 | 1/1970 | Wuster | 15/53 R |
| 3,499,180 | 3/1970 | Hurwitz | 15/97 B |
| 3,510,898 | 5/1970 | Tatara et al. | 15/97 B |
| 3,683,441 | 8/1972 | Fromme | 15/97 B |
| 3,765,043 | 10/1973 | Lesser | 15/97 B |
| 3,859,686 | 1/1975 | Breish | 15/97 B |
| 3,862,460 | 1/1975 | Rockafellow | 15/97 B |
| 4,057,866 | 11/1977 | Belanger | 15/97 B |
| 4,164,053 | 8/1979 | Shelstad | 15/97 B |

Primary Examiner—Edward L. Roberts
Attorney, Agent, or Firm—Ratner & Prestia

[57] ABSTRACT

A scrubbing apparatus for automobiles and other vehicles has three baskets of scrubbing curtains arranged in generally side-by-side relation transverse to the passageway through which the vehicle moves. The width of the curtains of the inner basket is preferably twice the width of each of the outer baskets. The curtain baskets are driven in an oscillatory manner by a single motor having two crank arms and connecting linkages so arranged that the oscillations of the outer baskets are in phase with each other but are out of phase with the oscillations of the inner basket. The preferred out-of-phase relationship between the inner and outer baskets is 90°. In a preferred arrangement, the baskets are driven by reciprocating rods connected to the baskets at a point below the overhead pivot points of the baskets.

11 Claims, 4 Drawing Sheets

SCRUBBING APPARATUS FOR VEHICLES

FIELD OF THE INVENTION

This invention relates to scrubbing apparatus for cleaning the exterior surfaces of an automobile or other motor vehicle.

BACKGROUND OF THE INVENTION

The present invention represents an improvement over the scrubbing apparatus shown, described and claimed in U.S. Pat. No. 3,859,686 issued Jan. 14, 1975 to Donald E. Breish and assigned to to the assignee of the present application.

In the apparatus shown and described in FIGS. 1-5, and also in FIGS. 7-8, of the aforesaid '686 patent, torsional reaction forces become established on the scrubbing apparatus which tend to twist the apparatus and cause it to shake and vibrate. This is believed to be due to the fact that at one side of the lengthwise center axis of the apparatus the scrubbing curtains, during at least a portion of the cycle, are swinging in the same direction as that in which the car is moving while at the other side of the apparatus the curtains are swinging in the opposite direction.

The description and drawings of the apparatus contained in the aforesaid '686 patent is incorporated into the present application as if fully set forth herein.

The differences between the apparatus of the '686 patent and the apparatus of the present application will be described herein below.

SUMMARY OF THE INVENTION

An important object of the invention is to provide a scrubbing apparatus of the general type shown and described in the aforesaid U.S. Pat. No. 3,859,686 but in which the tendency of the apparatus to twist in response to torsional reaction forces developed therein is eliminated. This is accomplished by so arranging the oscillatory curtain baskets, the drive, and the linkages, that the width of the curtains moving in opposite lengthwise directions are equal on each side of the lengthwise axis of the apparatus. In a preferred embodiment, three curtain baskets are provided, an inner basket and two outer baskets. The curtains of the inner basket have a width twice that of each of the two outer baskets. The oscillating movement of the inner basket is out of phase with that of the two outer baskets which oscillate in phase relative to each other.

Another object is to provide a scrubbing apparatus as aforesaid in which the drive for the oscillating motion of the baskets is supplied by a single motor.

A further object is to provide a scrubbing apparatus as aforesaid in which the single motor, through a pair of crank arms and connecting linkages, applies thrust forces at a point located below, rather than above, the pivot axis of the baskets thereby reducing the height of the apparatus.

Yet another object is to provide a scrubbing apparatus of the general type shown in the aforesaid '686 patent which is so constructed as to have a reduced net impact on an upstanding auto antenna.

DETAILED DESCRIPTION OF THE PREFERRED EMBODIMENT

Figure 2:
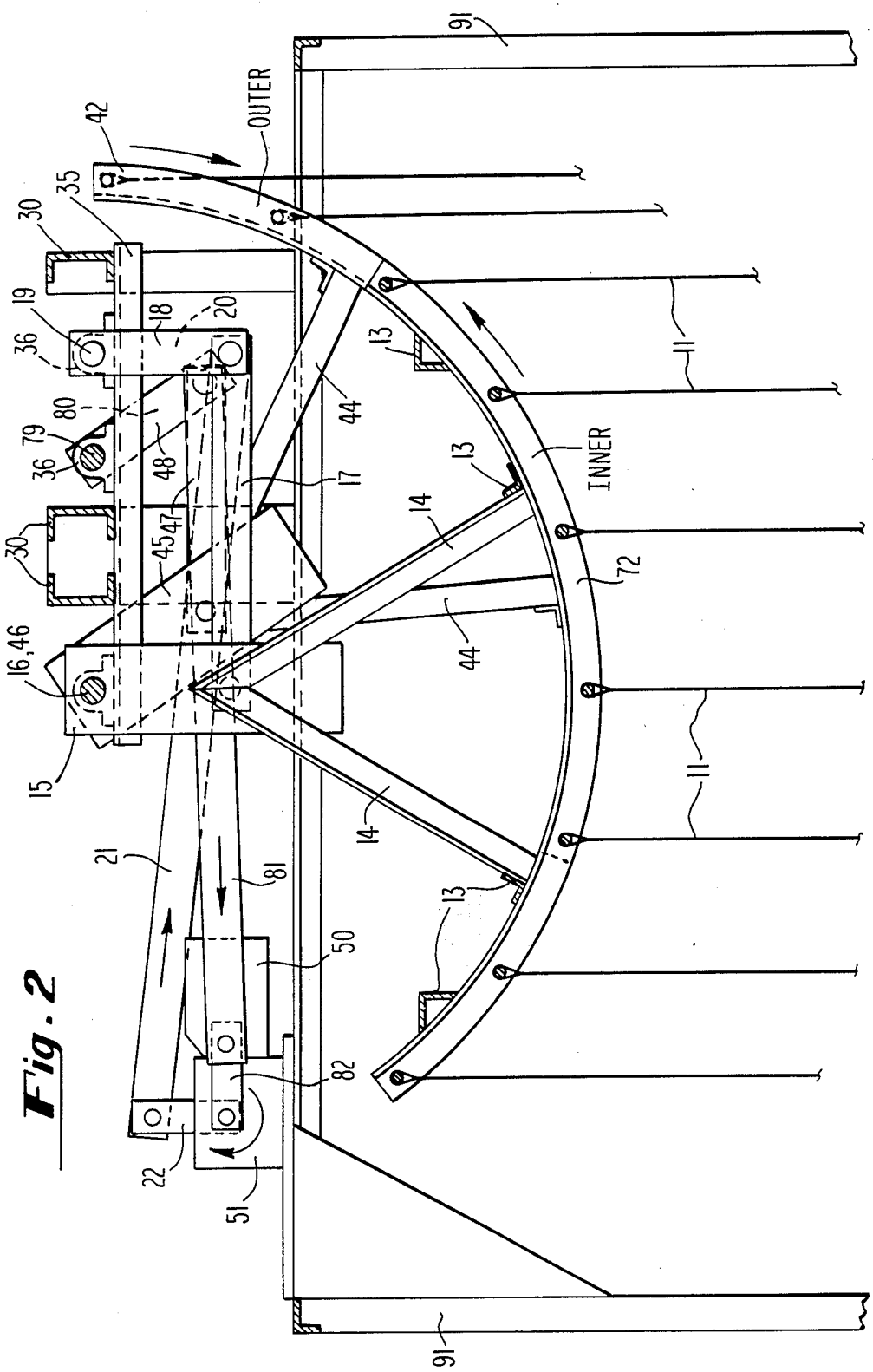
FIG. 2 is a side elevational view looking along the line 2—2 of FIG. 1.
Figure 3:
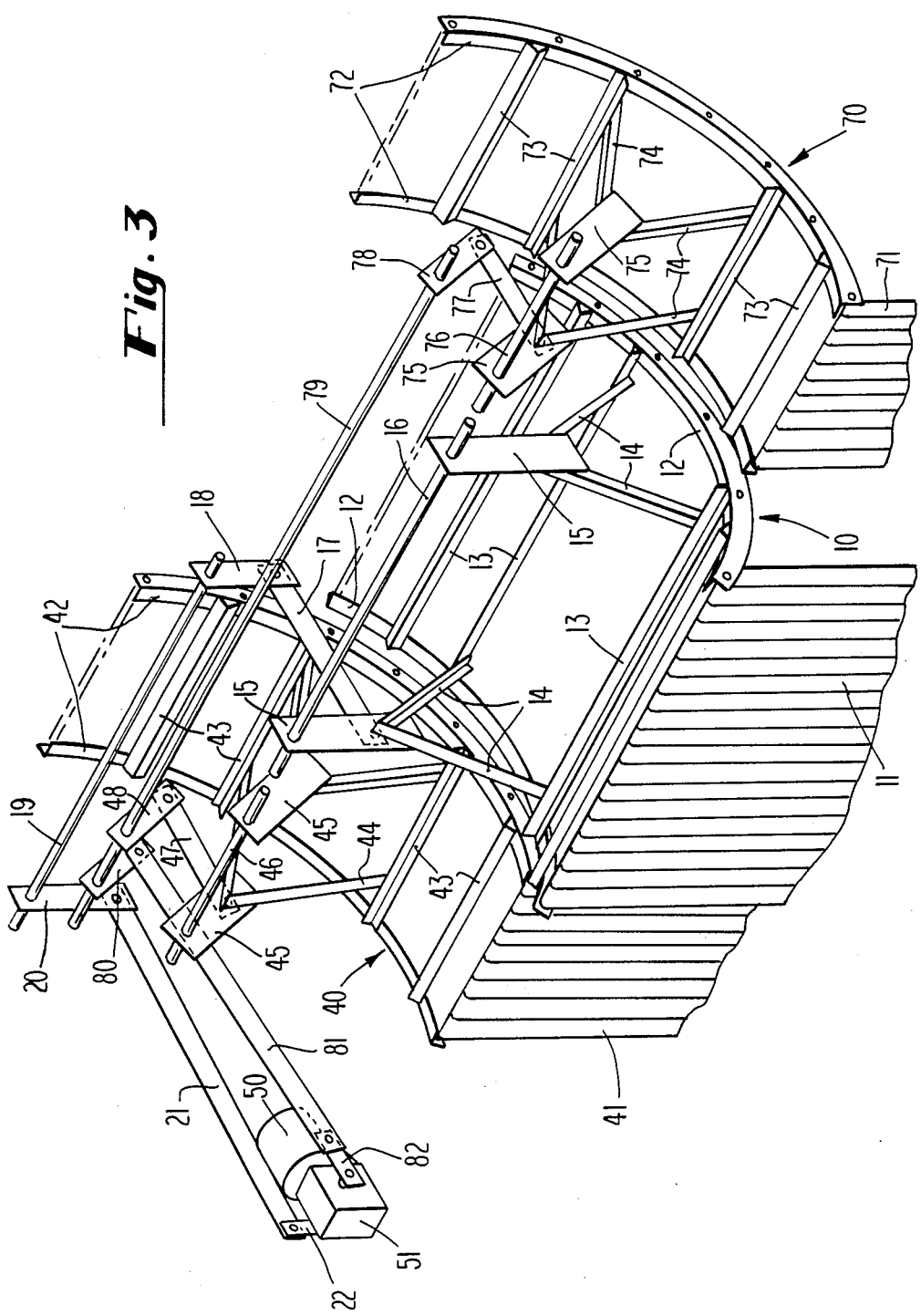
FIG. 3 is a perspective view showing the essential components of the preferred embodiment of the present invention with the frame and other structural support components being omitted.

Reference will first be made to FIG. 3 which is a diagrammatic perspective view of a preferred embodiment of the apparatus of the present invention. As shown, the apparatus comprises three baskets of curtains, an inner or center basket 10 and two end or outer baskets 40 and 70. The inner basket 10 contains a series of curtain strips 11 while the outer baskets 40 and 70 each contain a series of curtain strips identified 41 and 71, respectively. While only a single split curtain for each basket is shown in FIG. 3, each basket contains a series of split curtains spaced in the lengthwise direction of the apparatus, as is illustrated diagrammatically in FIG. 2.

As seen in FIGS. 2 and 3, each of the baskets 10, 40 and 70 is formed by a pair of arcuate angle members identified 12, 42 and 72, respectively. From these arcuate members the split curtains are suspended. The arcuate angle members of each pair are connected by cross bars identified 13, 43 and 73 respectively. Some of these cross bars are secured, as by welding, to the lower ends of pairs of angle members identified 14, 44 and 74. Angle members 14, 44, 74 extend upwardly in a converging fashion to form for each basket a pair of A-frame structures. At the apex, each pair of A-frame structures is secured, as by welding to a pair of oscillating levers identified 15, 45 and 75 respectively.

Figure 1:
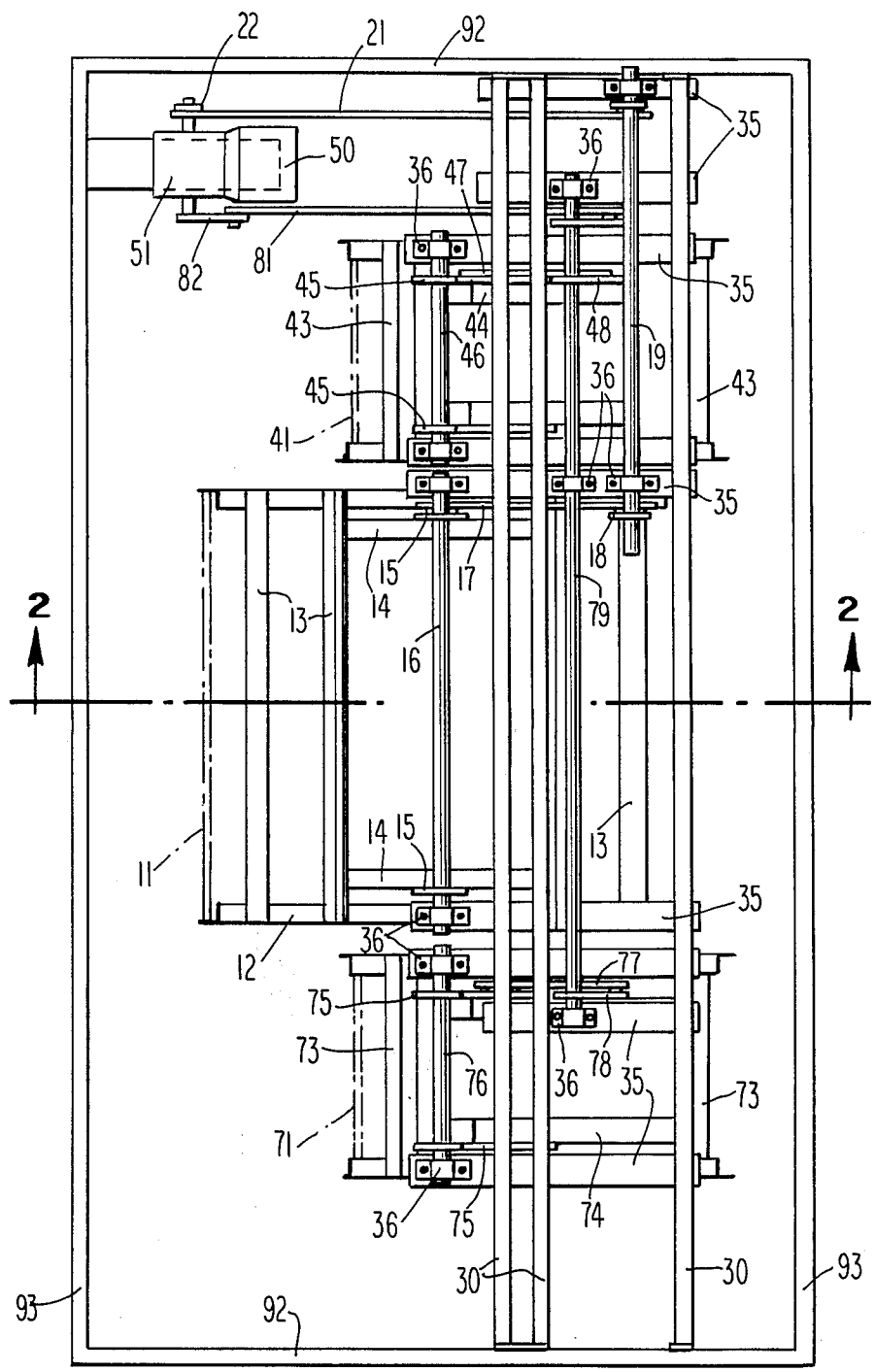
FIG. 1 is a top plan diagrammatic illustration of a scrubbing apparatus incorporating a preferred embodiment of the present invention.

Each of the pairs of oscillating levers 15, 45, 75 is secured, as by welding, to one of three rods 16, 46, 76 which extend transversely of the apparatus and which are journalled in pillow blocks 36, not shown in FIG. 3 but shown in FIGS. 1 and 2. The pillow blocks 36 are supported on a series of transverse and longitudinal C-shaped frame members or beams not shown in FIG. 3 but shown in FIGS. 1 and 2 identified 30 and 35 respectively.

Pivotally secured to a lower point on one lever of each pair of oscillating levers (the left lever as viewed in FIG. 3) is one end of a generally horizontal longitudinally-extending reciprocating drive bar identified 17, 47, 77 respectively. The other end of each of the drive bars is pivotally secured to the lower end of a generally vertical oscillating lever identified 18, 48, 78 respectively. The upper end of the each of the oscillating levers 18, 48, 78 is fixed, as by welding, to a transversely extending bar. There are two such bars 19 and 79, one much longer than the other. Lever 18 is connected to the shorter bar 19. Levers 78 and 48 are connected to the longer bar 79. Also connected, as by welding, to the shorter bar 19 is the upper end of a drive lever 20. The lower end of drive lever 20 is pivotally connected to one end of a first generally-horizontal longitudinally-extending reciprocating connecting link 21. The other end of link 21 is pivotally connected to crank 22 which is driven rotationally by motor 50 through a gear box 51.

Connected, as by welding, to the longer bar 79 is the upper end of a drive lever 80. The lower end of drive lever 80 is pivotally connected to one end of a second generally-horizontal longitudinally-extending reciprocating connecting link 81. The other end of link 81 is pivotally connected to crank 82 driven rotationally by the motor 50 through the gear box 51.

Having described the important components of the apparatus, its operation will now be readily understood. In the preferred embodiment, the curtains 11 of the inner or center basket 10 are preferably twice as wide as the curtains 41 and 71 of the outer baskets 40, 70. As stated another way, the sum of the widths of the outer curtains 41, 71 is equal to the width of the inner curtain 11. For example, each of the curtains 11 is four feet wide while each of the curtains 41, 71 is two feet wide. All three curtain baskets, 10, 40, 70 are driven in a oscillating manner. The outer baskets 40 and 70 oscillate in phase. The inner basket 10 is driven out of phase with the outer baskets. In a preferred embodiment, the inner basket 10 is driven 90° out of phase with the two outer baskets 40, 70. The out-of-phase relationship is illustrated diagrammatically in FIGS. 4A, 4B, 4C, 4D which will be described later.

Returning now to FIG. 3, the cranks 22 and 82 are, in the preferred embodiment, driven rotationally 90° out of phase. In FIG. 3, crank 22 is shown in the 0° or 12:00 o'clock position while crank 82 is in the 90° or three o'clock position. As the crank arms rotate clockwise, the connecting links 21 and 81 are driven in a reciprocating manner. This drives the levers 20 and 80 in an oscillating manner. Since the levers 20 and 80 are secured, as by welding, to the rods 19 and 79, each of these rods 19, 79 oscillates on its own axis. Oscillation of rods 19, 79, causes levers 18, 48 and 78 to oscillate and to drive bars 17, 47, 77 in a reciprocating manner. This drives the pairs of levers 15, 14, 45, 75 in an oscillating manner about the pivot bars 16, 46, 76 and drives the baskets 10, 40, 70 in a corresponding oscillating manner about bars 16, 46, 76.

Figure 4A:
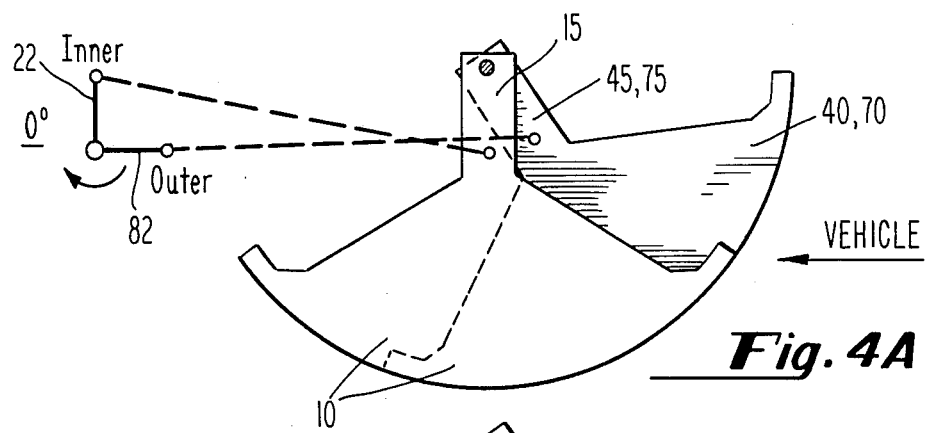
FIGS. 4A, 4B, 4C and 4D is a series of simplified diagrammatic illustrations showing the phase relationships between the oscillations of the center inner basket and the two outer baskets.
Figure 4B:
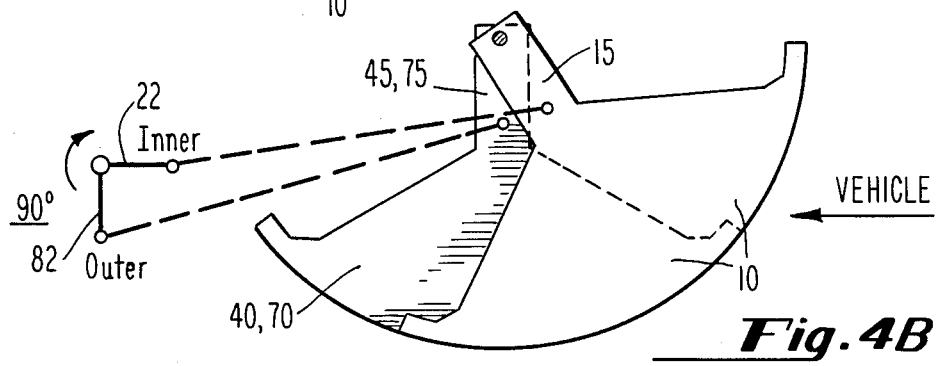
Figure 4C:
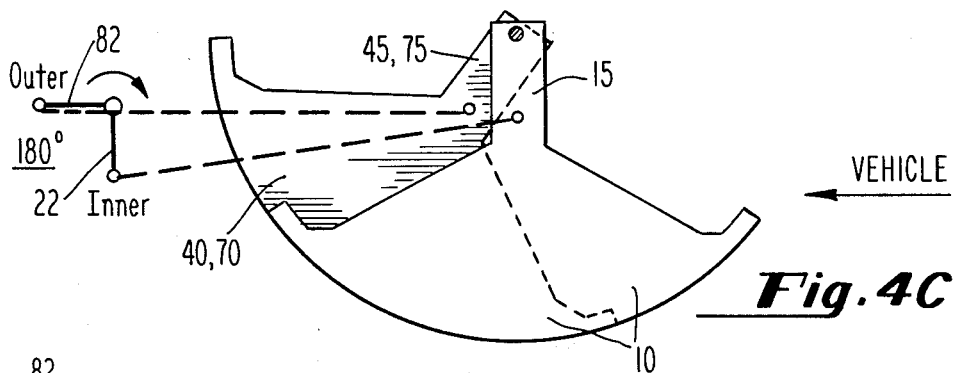
Figure 4D:
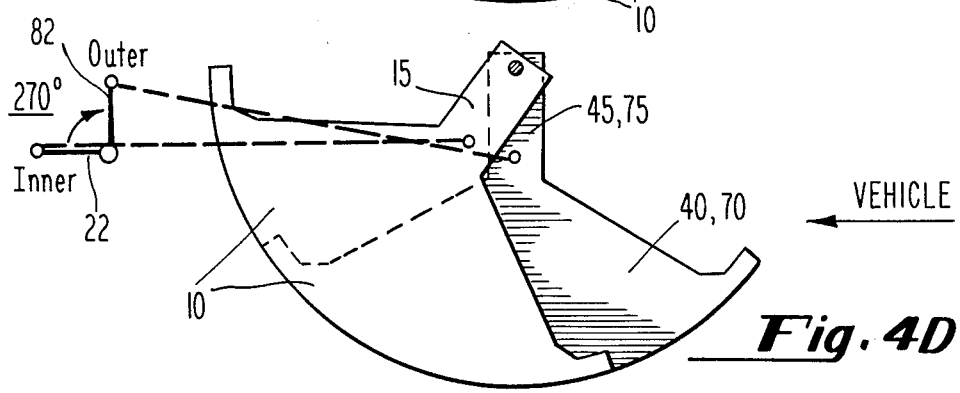

The out-of-phase relationship between the center basket 10 and the outer baskets 40, 70 is illustrated diagrammatically in FIGS. 4A, 4B, 4C and 4D. In FIG. 4A, crank 22 which drives center basket 10 is shown in the zero or twelve o'clock position while crank 82 which drives the outer baskets 40, 70 is shown in the 90° or three o'clock position. This corresponds to the phase position shown in FIG. 3. In FIG. 4A, as in FIG. 3, the center basket 10 is at its lower position while the outer baskets 40, 70 are at an upper limit of their pendulum-like swings. The position shown in FIG. 4A may be assumed to be the position occupied at the start of the first quarter of a 360° cycle. FIG. 4B shows the position at the start of the second quarter. The inner basket 10 has now been swung to its upper limit while the outer baskets 40, 70 have been swung back down to their lower positions. FIG. 4C illustrates the position at the start of the third quarter. The outer baskets 40, 70 have now been swung to their upper limits while the inner basket 10 has returned back down to its lower position. In FIG. 4D, which illustrates the position at the start of the fourth quarter, the inner basket 10 has swung up to its upper limit while the outer baskets 40, 70 have returned back down to their or lower positions.

In FIGS. 4A, 4B, 4C and 4D, if we assume that the auto being washed is moving from right to left, as indicated by the arrow, we see from FIG. 4A that in the first quarter the curtains of the inner basket 10 are wiping or rubbing in a direction opposite to that of the movement of the automobile, while at the same time the curtains of the outer baskets 40, 70 are wiping in the same direction as the movement of the auto. In the second quarter, (FIG. 4B) all of the curtains are wiping in the same direction, namely the direction in which the automobile is moving. However, the curtains of the center basket are lagging 90° behind the curtains of the outer baskets 40, 70. In the third quarter, (FIG. 4C) the center curtains are still wiping in the same direction as that in which the car is moving but the outer curtains are now wiping against the movement of the car. In the fourth quarter, (FIG. 4D) all curtains are wiping against the movement of the car but the center curtains are lagging 90° behind the curtains of the outer baskets.

In summary of FIGS. 4A, 4B, 4C, 4D, the oscillating movement of the curtain baskets 10, 40, 70 is such that in the first and third quarter of the full cycle, curtains are moving in opposite directions while in the second and fourth quarters all curtains are moving in the same direction but the center curtains are lagging behind the outer curtains. As a result, the reaction forces developed in the apparatus resulting from curtains being dragged lengthwise over the car, whether in the same or opposite directions as that in which the car is moving, are at all times equal on opposite sides of the longitudinal center axis of the apparatus. Thus, no torsional reaction forces are generated, and the apparatus of the invention avoids the development of those forces which cause the apparatus to vibrate and shake. It has been observed in prior art apparatus, that once the apparatus starts to vibrate and shake, such vibration and shaking tends to continue between cars, i.e., even when the curtains are not being dragged across the surface of a car. As previously indicated, it is believed that in prior art apparatus vibration and shaking result from the fact that the curtains are divided into two equally wide halves which swing in opposite lengthwise directions over the car during the operating cycle.

It is to be noted that, in the preferred embodiment, the apparatus of the present invention is driven by a single motor having two crank arms whose phase relationship, relative to each other, remains unchanged during operation. The use of single motor avoids the problem of maintaining proper phase relationship which would be the case if more than one drive motor were used.

An additional advantage which results from the curtain arrangement of the present application, is that the antenna on the car is frequently so positioned that it passes through the separation between an outer curtain and the center curtain and that, as a result, the antenna is subjected to a substantially decreased knock-over force.

In the preferred embodiment which has been described, the crank arms 22, 82 are 90° out of phase and the inner curtain basket 10 is driven in an osciland latory manner 90° out-of-phase relative to the outer curtain baskets 40, 70. The crank arms 22, 82 could, however, be positioned at a different relative angle, such for example as 180°, in which case the inner curtain basket 10 would be driven 180° out of phase relative to the outer baskets 40, 70. While this would provide a torsion-free operation, the 180° out-of-phase relationship is not preferred since at two times during each full cylce, all three baskets would be at the upper limits of their oscillating swing-like movements, one at one end and the other two at the other, and a smaller than desired amount of curtain material would then be in dragging contact with the car. This situation is avoided in the p referred 90° out-of-phase relationship. As seen in FIGS. 4A, 4B, 4C, 4D, in the preferred embodiment either the inner basket 10 or the outer baskets 40, 70 are passing through their lower positions during each of the four 90° segments of a full cycle. An additional reason for using a 90° out-of-phase relationship, rather than a 180° out-of-phase or in phase relationship, is that the bearing load and wear on the gear box 51 are reduced.

The drawing in FIG. 3 is adequate for an understanding of the operation of the apparatus of the present invention. The supporting frame members have, for simplicity, been omitted from FIG. 3. These frame members are however shown in FIGS. 1 and 2 and will now be briefly described.

As seen in FIGS. 1 and 2, the curtain baskets are supported on an open frame through which the automobile to be washed passes. In FIGS. 1 and 2 the auto may be assumed to move from right to left. The open frame includes vertical posts 91 which support at their upper ends two longitudinal beams 92 and two transverse beams 93 defining a rectangular structure. Supported on the longitudinal beams 92 are three C-shaped beams 30 which extend transversely across the structure. Secured to the underside of the transverse beams 30, as by welding, are a plurality of longitudinally extending beams each identified 35. Nine such beams 35 are shown in FIG. 1. Supported on each of the beams 35 are one or more pillow blocks 36 in which are journalled bars 16, 46, 76, 79 and 19. Eleven such pillow blocks 36 are shown in FIG. 1. It is believed that FIGS. 1 and 2 together with the foregoing description provides a sufficient understanding as to the manner in which the drive motor, the linkages and the curtain baskets are mounted on the open frame for oscillating out-of-phase movement.

We claim:

1. Scrubbing apparatus for vehicles comprising a frame having an open passageway therethrough for a vehicle, at least three scrubbing baskets supported in transverse side-by-side relation on said frame above said passageway defining one inner basket and two outer baskets, each of said scrubbing baskets including a pair of lengthwise spaced-apart members supporting in depending position therefrom a plurality of transverse scrubbing curtains arranged in generally parallel spaced relationship lengthwise of the apparatus, means pivotally supporting each basket at an overhead pivot point for swinging oscillatory lengthwise movement, reciprocatory members attached to said baskets, and motor drive means for so driving said reciprocatory members that the oscillations of said inner basket are out of phase with the oscillations of said two outer baskets, said outer baskets oscillating in phase with each other.

2. Scrubbing apparatus according to claim 1 characterized in that said open passageway has a lengthwise axis and in that at any one time the width of the curtains being moved in opposite directions are equal on each side of the lengthwise axis of the apparatus, and in that the curtains of said inner basket extend across said lengthwise axis.

3. Scrubbing apparatus according to claim 2 wherein said resciprocatory members are bar members attached to said baskets at a point below said overhead pivot point.

4. Scrubbing apparatus according to claim 3 wherein said motor drive means includes only a single motor having two crank arms connected to and driven by said motor, and linkages connecting said crank arms to said reciprocatory bar members.

5. Scrubbing apparatus according to claim 4 wherein some of said linkages connect one of said crank arms to the reciprocatory bar member which is connected to and drives said inner basket and other of said linkages connect the other of said crank arms to the reciprocatory bar members which are connected to and drive said outside baskets.

6. Scrubbing apparatus according to claims 4 or 5 wherein said two crank arms are disposed 90° out of phase relative to each other.

7. Scrubbing apparatus according to any of claims 2, 3, 4 or 5 wherein the curtains of said inner basket are twice as wide as the curtains of each of said outer baskets.

8. Scrubbing apparatus for cleaning exterior surfaces of motor vehicles, said apparatus comprising:
   a. framework means defining a path along which motor vehicle is adapted to travel said path having a center axis;
   b. a plurality of curtain baskets disposed laterally across said path in side-by-side relation, each of said baskets supporting a series of dependent curtains spaced apart in the lengthwise direction of said path;
   c. one of said baskets occupying a center position of said laterally disposed baskets, curtains of said center basket being disposed on each side of the center axis of said motor vehicle path and
   d. power means and linkage means connected to said baskets for swinging each of said baskets in an oscillatory manner about transversely disposed pivot points in such time relationship that the oscillations of said center basket are 90° out-of-phase with the oscillations of adjacent baskets on either side thereof.

9. Scrubbing apparatus according to claim 8 characterized in that said plurality of curtain baskets disposed in side-by-side relation across said path comprise an uneven number of baskets.

10. Scrubbing apparatus according to claim 9 characterized in that said uneven number is three.

11. Scrubbing apparatus according to claim 10 characterized in that curtains of said center basket are disposed equally on each side of said center axis.

* * * * *